United States Patent
Linnet et al.

(10) Patent No.: US 9,970,138 B2
(45) Date of Patent: May 15, 2018

(54) METHOD OF CONVERTING A GLASS FIBRE FABRIC MATERIAL AND PRODUCTS OBTAINED BY THE METHOD

(71) Applicant: UCOMPOSITES A/S, Bogø By (DK)

(72) Inventors: Anders Kristian Linnet, Copenhagen S (DK); Jakob Grymer Tholstrup, Kgs. Lyngby (DK)

(73) Assignee: UCOMPOSITES A/S, Bogø By (DK)

( * ) Notice: Subject to any disclaimer, the term of this patent is extended or adjusted under 35 U.S.C. 154(b) by 639 days.

(21) Appl. No.: 14/390,102

(22) PCT Filed: Apr. 4, 2013

(86) PCT No.: PCT/DK2013/050095
§ 371 (c)(1),
(2) Date: Oct. 2, 2014

(87) PCT Pub. No.: WO2013/149622
PCT Pub. Date: Oct. 10, 2013

(65) Prior Publication Data
US 2015/0167212 A1    Jun. 18, 2015

Related U.S. Application Data

(60) Provisional application No. 61/620,049, filed on Apr. 4, 2012.

(30) Foreign Application Priority Data

Apr. 4, 2012    (DK) .................................. 2012 70174

(51) Int. Cl.
| | | |
|---|---|---|
| *D04H 1/4218* | (2012.01) |
| *D04H 1/4274* | (2012.01) |
| *D01G 1/04* | (2006.01) |
| *D01G 11/00* | (2006.01) |
| *C03B 37/16* | (2006.01) |
| *D04H 1/46* | (2012.01) |
| *D04H 1/70* | (2012.01) |
| *D04H 1/732* | (2012.01) |
| *D04H 1/74* | (2006.01) |

(52) U.S. Cl.
CPC ........... *D04H 1/4218* (2013.01); *C03B 37/16* (2013.01); *D01G 1/04* (2013.01); *D01G 11/00* (2013.01); *D04H 1/4274* (2013.01); *D04H 1/46* (2013.01); *D04H 1/70* (2013.01); *D04H 1/732* (2013.01); *D04H 1/74* (2013.01); *D10B 2101/06* (2013.01); *F01N 2310/02* (2013.01); *Y02W 30/66* (2015.05); *Y10T 428/2938* (2015.01)

(58) Field of Classification Search
CPC ........ D01G 1/04; D01G 11/00; D04H 1/4218; D04H 1/4274; D04H 1/46; D04H 1/70; D04H 1/732; D04H 1/74
See application file for complete search history.

(56) References Cited

U.S. PATENT DOCUMENTS

| | | | | |
|---|---|---|---|---|
| 4,145,202 A | * | 3/1979 | Grodin | C03B 37/10 134/19 |
| 4,397,692 A | * | 8/1983 | Ramge | C03C 1/024 134/2 |
| 5,476,628 A | | 12/1995 | Baumgartl et al. | |
| 5,697,560 A | | 12/1997 | Bennett | |
| 6,029,477 A | * | 2/2000 | Hanvey, Jr. | B03B 9/062 241/243 |
| 2003/0054714 A1 | | 3/2003 | Peng et al. | |
| 2006/0141260 A1 | | 6/2006 | Haque et al. | |
| 2007/0017255 A1 | * | 1/2007 | Grove-Nielsen | B09B 3/00 65/482 |
| 2008/0108269 A1 | | 5/2008 | D'Silva et al. | |
| 2008/0160281 A1 | * | 7/2008 | Vickery | C03C 25/26 428/295.1 |
| 2009/0208732 A1 | | 8/2009 | Middendorf et al. | |
| 2010/0209308 A1 | * | 8/2010 | Kunze | C04B 30/02 422/179 |
| 2010/0314028 A1 | * | 12/2010 | Hedges | B29C 70/083 156/93 |
| 2011/0230615 A1 | * | 9/2011 | Van Der Woude | C03C 25/246 524/584 |
| 2011/0248420 A1 | * | 10/2011 | Cordts | D04H 1/4209 264/115 |

FOREIGN PATENT DOCUMENTS

| | | |
|---|---|---|
| CN | 1076975 A | 10/1993 |
| DK | PA200201794 | 5/2004 |
| EP | 0682134 A2 | 11/1995 |
| GB | 1569217 A | 6/1980 |
| JP | 09210289 | 8/1997 |
| WO | 02/16104 A2 | 2/2002 |
| WO | 2005/040057 A1 | 5/2005 |
| WO | 2008145131 A1 | 12/2008 |

OTHER PUBLICATIONS

Gulich et al., Recycling Glass Fibres—Raw Material for Use in Technical Applications, Allgemeiner Vliesstoff-Report, 2007, pp. 18/19.

* cited by examiner

*Primary Examiner* — Shaun R Hurley
(74) *Attorney, Agent, or Firm* — Dinsmore & Shohl LLP

(57) ABSTRACT

In order to recycle glass fiber/fiber fabric production waste material, such as a material used in the manufacturing of rotor blades for wind turbines, and preferably where the material is bendable or flexible and reinforced in a plurality of layers in one or more directions in planes that are parallel with the surface of the material and stitch bonded together, the material is mechanically processed involving a size reduction of the material into shorter fiber length, in order to convert the material into one or more substantial pure glass fiber products. In this way it is possible inter alia to further process the material and create materials such as acoustic insulation wool, and chopped glass fiber strands.

19 Claims, 4 Drawing Sheets

METHOD OF CONVERTING A GLASS FIBRE FABRIC MATERIAL AND PRODUCTS OBTAINED BY THE METHOD

CROSS-REFERENCE TO RELATED APPLICATIONS

This application is the U.S. National Phase of PCT/DK2013/050095 filed Apr. 4, 2013, which claims priority of Danish Patent Application PA 2012 70174 filed Apr. 4, 2012, and U.S. Provisional Patent Application 61/620,049 filed Apr. 4, 2012.

FIELD OF INVENTION

The present invention relates to a method of converting a glass fibre fabric material, in particular glass fibre fabric waste material, into other glass fibre products, and products obtained by the method.

BACKGROUND OF INVENTION

Glass fibre fabric material is used in many applications, such as in the manufacturing of rotor blades for wind turbines.

During the manufacturing of for example rotor blades, a residual glass fibre material is produced, for instance from off-cuts, short-ends, rejected material or scrapped glass fibre material. This production waste material is today deposited in the ground, i.e. landfilled, and due to its inert characteristics it will stay in the ground for hundreds of years.

It is very energy intensive to manufacture glass fibre, and the waste fabric material represents an unnecessary use of resources and energy. It is therefore desirable if the waste glass fibre fabric material may be reused.

WO 2005/040057 described recycling of glass fibre material being extracted from a composite material containing glass fibre embedded in a matrix material, i.e. a glass fibre reinforced plastic material, such as worn out wind turbine blades or glass fibre boats. The glass fibre material is extracted from the composite material through a pyrolysis process or a gasification process.

SUMMARY OF INVENTION

Whereas it has previously been described to recycle glass fibre material from worn out wind turbine blades wherein the wind turbine blades are composed of glass fibres embedded in a matrix material then the present invention relates to recycling of glass fibre fabric material, ie a glass fibre material not being embedded in a matrix material, Accordingly, it is an object of the present invention to convert glass fibre fabric material, in particular glass fibre fabric waste material, such as off-cuts and short-ends, into another glass fibre product. Thereby the environmental result of the invention is reduction of waste landfills as well as reduction of $CO_2$ as the invention produces a material which can be a substitute for virgin glass fibre.

Accordingly, in one aspect the invention relates to a method of converting a glass fibre fabric material into another glass fibre product by a mechanical process, said fabric material is made up of a single layer or multilayers of glass fibres in one or more directions assembled into a fabric, wherein the fabric material is processed by size reducing the glass fibres, and subsequently the size reduced fibres are further processed into said other glass fibre product.

In this way it is also possible to produce a half finished product useful in producing further useful products, as will be explained later.

It has been found that the products obtained through the processes according to the present invention have superior characteristics as compared to products obtained conventionally from virgin glass fibres. In particularly, the glass fibre products obtained by the present invention have superior insulation characteristics, such as superior acoustic absorption characteristics, see further discussion below.

The present invention also relates to products obtained from the above process. In particular, the invention also relates to A non-woven glass fibre fabric wherein the glass fibres vary in length from 1 mm to 80 mm, such as from 1 mm to 70 mm, in particular wherein the non-woven glass fibre fabric is produced according to a method as defined herein.

Glass fibre wool wherein the glass fibres vary in length from 10 cm to 20 cm, in particular wherein the glass fibre wool is produced according to a method as defined herein.

Insulation wool comprising the glass fibre wool as defined herein, such as acoustic insulation wool according for use in exhausts systems and mufflers.

Cavity wall insulation and insulation batts.

A composition of chopped glass fibre strands, wherein the glass fibres vary in length from 2 mm to 20 mm, in particular chopped glass fibre strands use in bonding pastes, in thermosetting plastics, in gypsum plasterboards or in thermoplastic.

Using waste glass fibre fabric as starting material also provides an additional effect in relation to $CO_2$ production since the $CO_2$ production in the preparation of useful products from waste material is extremely low as compared to producing the same products from virgin glass fibres because virgin glass has to be melted to obtain similar products.

DESCRIPTION OF DRAWINGS

FIG. 1 illustrates a uni-directional glass fibre reinforcement multiaxials fabric with fibres orientated in one direction. The fibres are stitched together.

FIG. 2 illustrates a biaxial glass fibre reinforcement multiaxials fabric with the fibres oriented in two directions, +/−45 degrees. Only one is shown.

FIG. 3 illustrates the glass fibre wool that is the result of cutting the material into smaller fibres using a guillotine cutting machine and further processed according to the invention involving a tearing line.

FIG. 4 illustrates a glass fibre product as shown in FIG. 1 after processing according to the invention involving a fine opener.

FIG. 5 illustrates a glass fibre product after processing according to the invention involving a shredder fitted with a screen size of 25 mm.

FIG. 6 shows a semi-finished product consisting of chopped glass fibre strands.

DETAILED DESCRIPTION OF THE INVENTION

Figure 1:
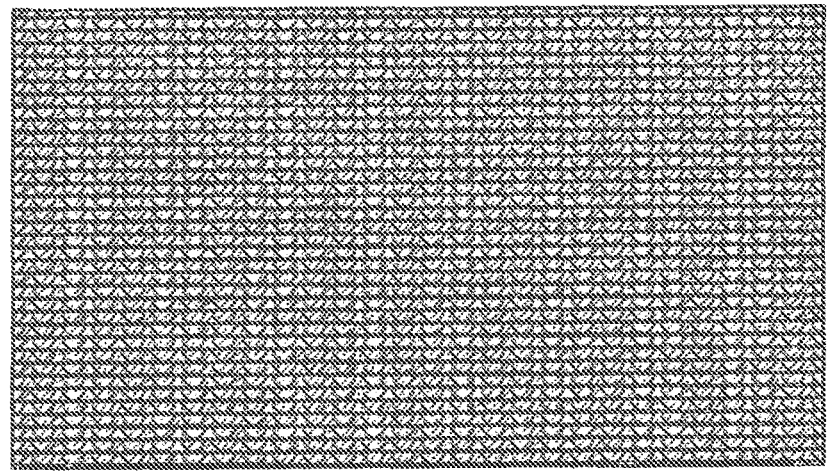
FIG. 1 and FIG. 2 show glass fibre production waste material that is processed according to the methods defined in the claims.
Figure 2:
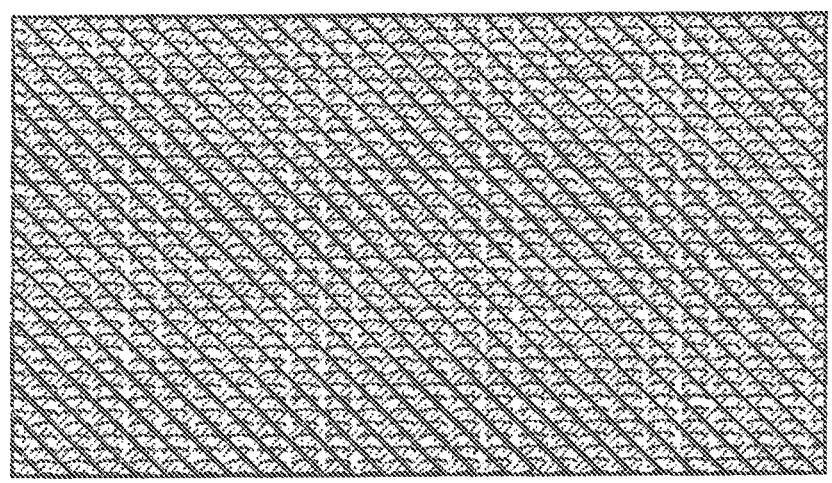
Figure 3:
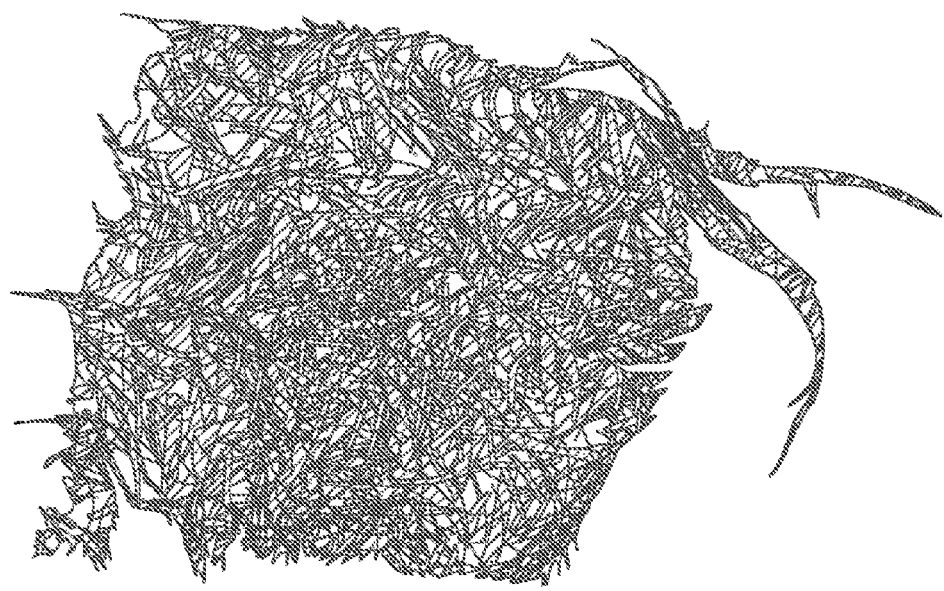
FIG. 3-6 illustrate products obtained after the processing steps according to the invention.
Figure 4:
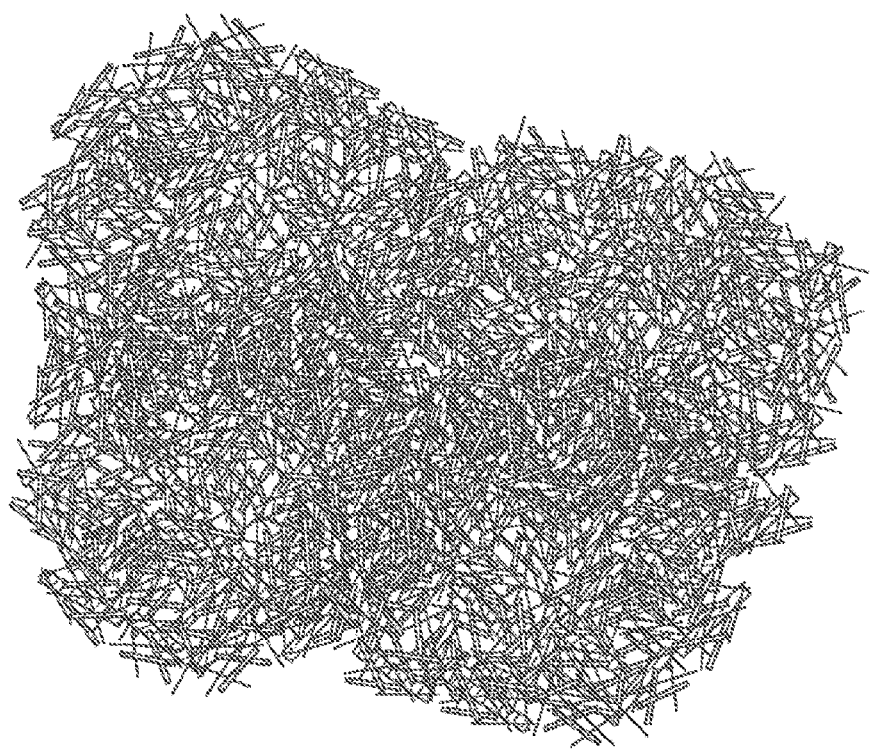
Figure 5:
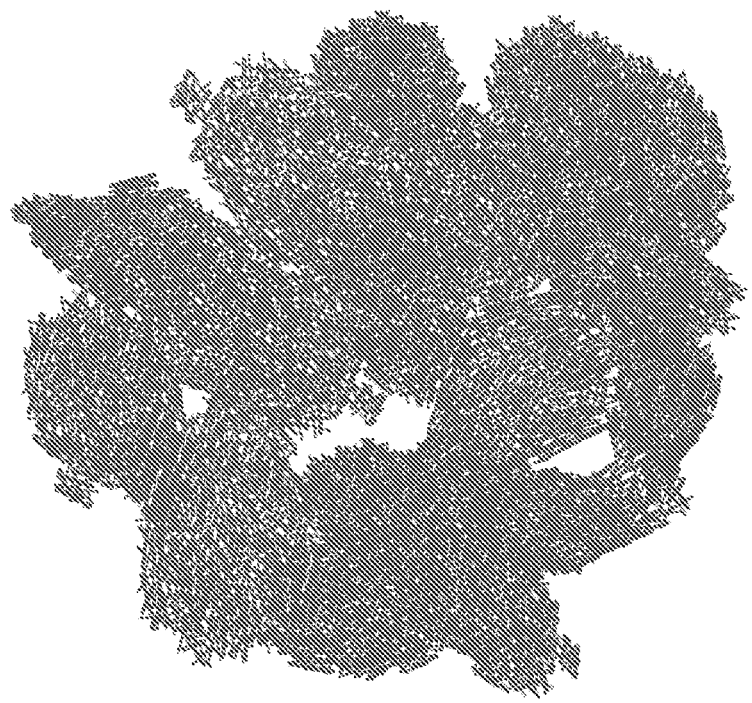
Figure 6:
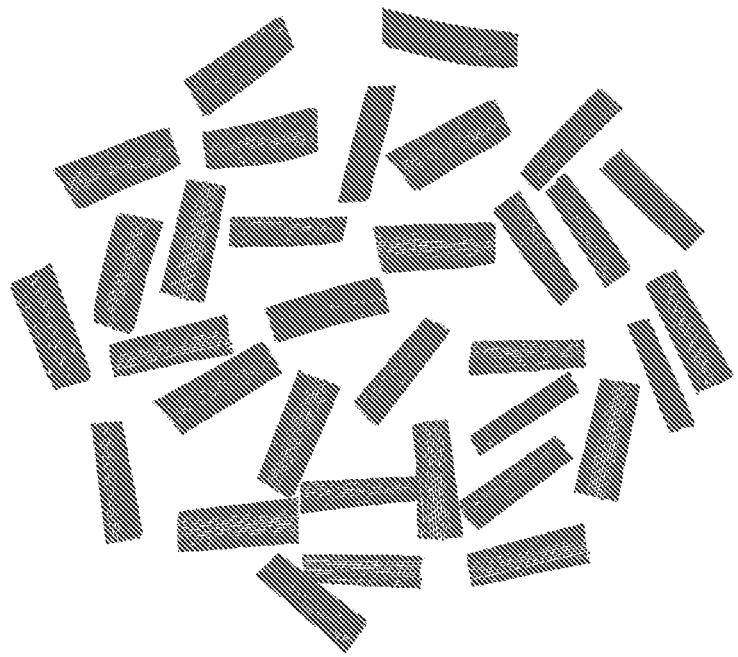

The present invention relates to conversion of glass fibre fabric into other glass fibre products, whereby it is possible to reuse waste material, such as short-ends and rejected material, in particular irregular waste fabric pieces, such as off-cuts.

A glass fibre is composed of glass filaments bundled into a roving. The diameter and number of filaments in a roving may vary leading to the variations of the diameter of a roving. Normally the filaments are coated with a sizing.

By the term "glass fibre fabric" is meant one or more layers of unidirectional rovings that are assembled into a fabric or cloth, ie a kind of a textile normally being flexible and bendable. The glass fibres may be assembled into a fabric by any suitable method, such as by stitching. Glass fibre fabric of one or more layers of fibres is conventionally used in the production of for example wind turbine blades or boats by cutting the fabric into the desired shape and embedding the cut fabric in a matrix consisting of for example epoxy material or a polyester resin or a vinylester resin before the final shape of the product is made. Accordingly, a glass fibre fabric is free from matrix material, since it is a starting material which is embedded in matrix material only after being cut into the final shape whereafter it is called glass fibre composite or glass fibre reinforced plastic.

By the term "unidirectional" is meant that the fibres in one layer of fabric are parallel.

By the term "multiaxial reinforcements" or simply "multiaxial" is meant fabric made up of multiple plies or layers of parallel fibres, each lying in a different orientation or axis.

In a preferred embodiment of the invention the glass fibre fabric comprises multiaxial reinforcements wherein layers of unidirectional fibers are assembled and stitched together. They provide strength and stiffness in multiple directions depending on the controlled orientation of the fibers. Multiaxials include unidirectional, biaxial, and triaxial and quadraxial fabrics, for example tailored to have the reinforcement in four main directions 0 degrees, 90 degrees, +45 and −45 degrees, but special directions between 45 degrees and 90 degrees also occur. Some, but not all, of the multiaxials have a chopped strand mat (CSM) layer or different types of surface mats added on one side of the fabric and then it is referred to as combination products. The glass fibre reinforcement multiaxials normally range in weight from 200 g/m$^2$ to 2500 g/m$^2$, such as from 1000 g/m$^2$ to 1300 g/m$^2$.

The glass fibre fabric normally consists of various glass types, including (but not limited to) E-glass, S-glass, R-glass, H-glass, D-glass and ECR-glass.

The glass fibre fabric material is converted into another product before any additional substance is added to the fabric, and accordingly, the glass fibre fabric material is preferably bendable or flexible made up of a single layer or multilayers in one or more directions in planes that are parallel with the surface of the material, and more preferably the glass fibres are assembled through stitching.

The glass fibre fabric material may have different glass fibre dimensions and different thickness as well a being coated with various types of sizing. Normally, the diameter of a glass filament is about 3-25 μm. Furthermore various sizes of rovings may be used, where the term roving is used in it's conventional meaning, namely a bundle of glass fibre filaments.

Size-Reduction

The glass fibre fabric material is converted by processing the material by a mechanical process for size reducing the glass fibres, and subsequently the size reduced fibres are further processed into said other glass fibre product. The size-reduction is performed by any mechanical process suitable for the further processing of the material.

Shredding Process

Accordingly, in one embodiment the mechanical process is performed by a shredding process downsizing the material into glass fibres with shorter fibre lengths. The shredding is performed in any suitable apparatus, such as a shredder having the specifications discussed below. Additionally the glass fibres may be passed through a screen to obtain a more homogenous fibre length.

In the shredder the glass fibres are normally size reduced to a length of from 10 mm to 100 mm, such as from 20 mm to 80 mm, such as from 25 mm to 50 mm.

Normally the size reduced glass fibre material obtained is inhomogeneous with respect to the glass fibre lengths, having glass fibres varying within the intervals mentioned above. The shredded material may then be further processed by a filtering process through a screen. The size distribution of fibres after being passed through a screen is typically so that about 30-40% of the fibres have a length in the middle 20% of the interval.

The size distribution of fibres being passed through a screen of 50 mm is for example:
Appr. 20% of the fibres are in the interval of 0-10 mm
Appr. 30% of the fibres are in the interval of 10-20 mm
Appr. 38% of the fibres are in the interval of 20-30 mm
Appr. 10% of the fibres are in the interval of 30-50 mm
Appr. 2% of the fibres are in the interval of +50 mm The size distribution of fibres being passed through a screen of 25 mm is for example:
20% of the fibres are in the interval of 0-5 mm
30% of the fibres are in the interval of 5-10 mm
38% of the fibres are in the interval of 10-15 mm
10% of the fibres are in the interval of 15-25 mm
2% of the fibres are in the interval of +25 mm The glass fibre material obtained by the shredding process may be used for any purposes wherein the glass fibre length is suitable. In particular the glass fibre material obtained may be used for producing a non-woven glass fibre material through an air-laid process discussed below.

Furthermore, the shredded glass may be used as insulation material in buildings substituting mineral wool, polystyrene beads and paper wool as cavity wall insulation material.

Opening Process

In another embodiment the size-reduction is performed in an opening process reducing the glass fibre fabric material into smaller glass fibres with shorter fibre lengths. The opening process is a tearing process which is a more gentle process than the shredding process. The opening process is preferably performed in a fine opener comprising a feeding conveyer unit, feeding unit, working rollers and a main operation roll, more preferably as described with specifications below.

After being size-reduced in the opening process, the glass fibres may be further processed by a filtering process through a screen to provide a more homogenous material. The resulting glass fibre product is a glass fibre wool which may be used as such or processed further.

Cutting Process

In yet another embodiment the glass fibre fabric material is size-reduced by a cutting process which cuts the material into glass fibre strands. A particularly efficient process is provided if the cutting process is performed using knives made from tungsten carbide. The cutting process may be followed by a tearing process before obtaining the final glass fibre product.

Due to the nature of the starting material, i.e. the glass fibre fabric material often in irregular pieces and often having glass fibres in several axes, the glass fibres obtained after the cutting process may be inhomogeneous with respect to lengths and cutting edges not necessarily perpendicular to the fibre axis. Thus, the composition of chopped glass fibres obtained after the cutting process differs from the composition of chopped glass fibres obtained from cutting glass fibres not being assembled in a fabric.

The cutting process may lead to glass fibres in different length intervals depending on the final product, such as from 2 mm to 30 mm. In one embodiment it is preferred that the glass fibre strands are further processed by a filtering process purifying the glass fibre strands.

In one embodiment the glass fibre fabric material is cut in order to obtain glass fibre strands having a length of from 2 mm to 20 mm. The size distribution of fibres resulting from the cutting process varies within a few mm from the preset cutting size, such as within ±2 mm, more preferably within ±1 mm. For example if the cutting size is set to 12.5 mm, the fibres will normally lie in the interval of from 12.5 to 14.5 mm, such as from 11.5 to 13.5 mm. These small fibre lengths are especially suitable for increasing fire resistance of for example gypsum plasterboards when added in the manufacturing process of the plasterboards.

In another embodiment the glass fibre fabric material is cut in order to obtain glass fibre strands having a length of from 5 cm to 30 cm, such as from 8 cm to 20 cm. The size distribution of fibres resulting from the cutting process varies within a few cm from the preset cutting size, such as within ±2 cm, more preferably within ±1 cm. For example if the cutting size is set to 17 cm, the fibres will normally lie in the interval of from 15 to 19 cm, such as from 16 to 18 cm. These longer fibre lengths are especially suitable as a starting material for the production of glass fibre wool, see also further description below.

In one embodiment downsized chopped sorted glass fibres strands are also moistened before being used to increase the efficiency of the process wherein the chopped fibre strands are used. This is for example relevant when the fibre strands are used for increasing fire resistance of for example gypsum plasterboards.

Air-Laid Process

The size reduced glass fibres may be further processed by an air-laid process into a non-woven fabric. For example the air-laid process is performed in an air-laid plant having the specifications as discussed below.

The air-laid process is conducted at temperatures below the melting temperature of the glass fibres, such as below 300 degrees centigrade, such as below 200 degrees centigrade. The glass fibre product produced through the air-laid process may be used for any suitable product, such as the production of a non-woven material, for example for insulation bats.

Needle-Punching Process

The glass fibre wool obtained as described above may be used as such, and may also be further processed through a needle punched processing into a non-woven needle mat.

The production of a needle mat may be performed by any suitable method; the needle punched processing is for example performed at temperatures below 300 degrees Celsius in order to avoid melting of the glass fibres.

Calendar Process

The resulting products being for example a non-woven felt, air-laid or needle punched, may subsequently be taken through a calendar process. In one embodiment the calendar process is performed with two cylinders that impart heat and pressure as the sheets are drawn between them in order to increase density and cohesiveness.

The purpose of this operation is to generate the aspect of a solid product where the fusible part of the bi-component fibre is fused under pressure rollers or forms. This operation can be done at different times depending on the needed product.

Done just after the passage through the oven, this gives the produced non-woven its final shape and density. Done using a moulding form, it allows the production of non-woven solid form. In both cases, complex products can be made using different types of textile product, either non-woven or knitted.

Products

By using the various methods defined above, it is possible to produce a range of products as discussed below and further exemplified in the examples. The products obtained by the invented process differ in general from corresponding products obtained from virgin glass fibres, in that the size distribution of fibres in the products vary much more than what is found in products made from virgin glass fibres.

Chopped Glass Fibre Strands

In one embodiment the product obtained is a composition of chopped glass fibre strands. The strands can be chopped at almost any required length from 3 mm to 30 mm. Due to the nature of the starting material, the filaments do not necessarily stick perfectly together in the strand (as they do in a virgin chopped strand)—single filaments tend to become loose and fall off the strand.

Furthermore, as discussed above the strands will vary slightly in length. Some will be slightly longer and some shorter (+/−1 mm) due to the starting materials and the chopping process.

Also, the chopped strands are not chopped off 100% straight due to the chopping process. Some chopped strands are cut straight, others slightly skewed.

Again due to the starting material, small pieces of stitching thread, such as polyester thread, may be found in between the chopped strands. Normally the content of thread is from 0.1% to 1.5%.

Also the chopped strands may be contaminated with glass fibres from the thin layer of chopped strand mat that is often stitched to the back of the glass fibre fabric.

The chopped glass fibre strands may be used as reinforcement material as any virgin chopped glass fibre strands, such as in gypsum plasterboards, bonding pastes, thermo plastics and thermosetting plastics, for example BMC, SMC and DMC.

Glass Fibre Wool

In another embodiment the product obtained is glass fibre wool. The glass fibre wool obtained through the methods described herein may be used in any applications wherein glass fibre wool produced from virgin glass fibres is normally used.

The glass fibre wool produced from the glass fibre fabric is preferably produced in a fine opening process as described above from a starting material being either the glass fibre fabric material or chopped strands.

The glass fibre wool consists of fibres having a length of from 12 to 20 cm, such as from 14 to 18 cm. Due to the opening process and the starting material the glass fibres do not have exactly the same length; some fibres are several cm shorter and some are longer.

The visual appearance of the wool obtained by the method according to the invention is fluffy and airy. The glass appears quite homogenous; however, it is possible to see the varying density. Also it is possible to see small pieces of thread, such as polyester thread. The content of thread is normally in the interval of 0.1-2.5%, such as 0.5-2.5%.

In one embodiment the wool is pre-packed in a net. The wool in the net may be used directly without removing the packaging material thereby facilitating the use of the material. The net is preferably made of polyethylene whereby when the wool is used in environments with high temperatures, such as in exhausters, the net will melt during use.

Needlemat

The glass fibre wool described above may be used for producing a needlemat felt by any method known to the skilled person. The term needlemat is used interchangeably with the terms nonwoven needlemat and needle felt.

The visual appearance of the needlemat felt produced according to the present invention looks homogenous but it is possible to see small pieces of thread. Colour is typically white-yellow and varies slightly in colour. The content of thread, such as polyester thread, is normally in the interval of 0.1-2.5%, such as 0.5-2.5%.

The needlemat felt produced according to the present invention may be used for the same purposes as needlemat felt made from virgin glass fibres, i.e. acoustic insulation media for exhaust silencers, thermal insulation for domestic appliances, such as insulation batts, filtration, heat-shields as well as any general industrial thermal and acoustic insulation Shredded Glass Glass fibre fabric material converted into shredded glass fibres may be used as any shredded glass fibres from virgin glass fibres.

First of all, the shredded glass obtained from the shredded process may be used as insulation material in buildings substituting mineral wool, polystyrene beads and paper wool as cavity wall insulation material.

Furthermore, the shredded glass may be used for producing a non-woven felt through an air-laid process discussed above.

Due to the starting material and the production process, the size of fibres can vary depending on screen size ranging from 15 mm to 50 mm. There will be a relatively large difference on the fibre length no matter which screen size is mounted. In other words, if a screen of 25 mm is mounted, the fibres can vary from 1 mm to more than 30 mm due to the process.

Furthermore, there is a residual amount of glass fibre dust present in the product. The glass has a tendency to lump together in the size of small ball-like structures.

The visual appearance of the shredded glass according to the present invention is a material not looking very homogeneous due to the varying of fibre lengths and the amount of fibres lumped together in what appears to be randomly.

The content of stitching thread, such as polyester thread, is normally in the interval of 0.1-2.5%, such as 0.5-2.5%.

The shredded glass usually consists of more than one type of glass fibre reinforcement fabric. This means the shredded glass will consist of fibres with different types and diameters of filaments coated with various types of sizing and various sizes of rovings used.

Nonwoven Felt

The shredded glass obtained according to the present method may be used for producing a nonwoven felt by any suitable method known to the skilled person. The term nonwoven felt is used interchangeably with the terms nonwoven airlaid felt and nonwoven airlaid.

The visual appearance of the non-woven felt is typically as follows: The felt looks quite homogeneous but it is evident that fibres vary in size, and some fibres have not opened fully in the shredding process.

The content of thread, such as polyester thread, is normally in the interval of 0.1-2.5%, such as 0.5-2.5%.

The nonwoven felt can be produced with any suitable height (thickness), such as between 1 mm to 400 mm.

The nonwoven felt is particularly useful as insulation material.

The shredding process as described above is followed by a process performed in a volumetric feeding device. The fibres are blown in the drum with small holes or slots. The drum is in contact with a woven band with a vacuum-operated device to suck the fibres and maintain them on the conveyor belt.

In one embodiment bi-component fibres, also called bico fibres, are used. Bico fibres have a core with normal melting temperature and an outer shell with low melting temperature. It is often a blend of polyester and polyethylene. Bi-component fibres, with their low melting point, create a better cohesion between the fibres when passing through the oven.

Insulation Characteristics

The products obtained by the process according to the invention and described above are used for insulation purposes in many different situations. Some are used for thermal insulation in buildings, and others are used for acoustic insulation, for example in buildings and vehicles.

The products obtained by the present invention have been found to have superior insulation properties as compared to products obtained from virgin glass fibre material. As shown below in the example the products according to the present invention exhibits better insulation properties at a lower density than conventional products and consequently less material may be used in order to obtain the same characteristics. It has been shown that the products has 25% to 50% better insulation properties per weight unit as compared to conventional material, and in particular 25% to 50% better acoustic insulation properties per weight unit, such as 30% to 40% better acoustic insulation properties per weight unit.

Also the products have a better thermal performance being heat resistant up to 750 to 800°

Without being bound by theory it is believed that the superior properties are caused by the mechanical treatment of the untreated glass fibres in the fabric, wherein the term untreated means as defined above that no matrix has been added to the fibres nor removed from the fibres.

Little Weight Loss

It has also been found that the products obtained as described herein have a smaller weight loss during use as compared with conventional glass fibre material, in particularly when the glass fibre products are used in heated environments. It appears that the products obtained according to the invention has a weight loss which is less than half of the normal weight loss leading to a better product because the insulation properties decreases with decreasing weight.

Again without being bound by theory it is believed that the surface of the glass fibre products hardens and protects the glass fibre product like a shell due to stitching threads holding the fibres in place in the fabric.

Applications

The products obtained in accordance with the present invention may be used in a variety of applications, such as reinforcement material and insulation material.

In particularly, the products may be used as:

Thermal and/or acoustic isolation in buildings, such as cavity walls insulation, between floors, under roofs, in doors, technical insulation around pipes, and in vehicles, such as cars and trucks, boats and airplanes, mufflers and exhaust emission control systems, and gas turbines.

Also the products may be used as flame-retardants in suitable application, such as in buildings and vehicles, for example for use in fire-doors.

Facilities

The processes as described above may be carried out in any suitable facilities. In one embodiment some of the processes are carried out in mobile facilities so that it is possible to produce the glass fibre product at the place of their further use. This is particularly relevant when the final product is more voluminous than the starting material since the final product would require more transporting facilities than the starting material. Thus, by carrying out the processes in a mobile facility environmental advantages are obtained.

In one embodiment a shipping container is rebuilt to include a fine opener production line, such as a fine opener with silo, a condenser and a bailing press as well as a shredder.

EXAMPLES

In the following examples the equipment described below was used:

Guillotine Cutting Machine
Preferred Technical Specifications:
  This cutting machine was equipped with a tungsten carbide mobile knife to cut hard materials
  Cutting width: 280 mm effective for a 700 mm table infeed width
  Acceptable compressed material thickness: from 30 mm to 50 mm according to the type of material
  Maximum material thickness at infeed: +/−100 mm according to material compressibility
  Cutting speed: 400 cuts per minute
  Range of cutting lengths: 6 mm to 160 mm
  Production varied according to the material cutting length and loading may reach over 1000 kg/hour
  The cutting machine was driven by a three phase enclosed motor with cooled housing
  Total installed power: 9.2 Kw/50 Hz-10.6 Kw/60 Hz
Operation Information:
  The material was conveyed on a feeding belt to an awaiting hardened steel roll assembly. The rolls compressed the material on the feed table and drew it efficiently toward the knives.
  The scissor effect produced between the carbide mobile knife and the fixed knife guaranteed a clean edged cut easily and accurately.
  The roll adjustments enabled a trouble-free feeding of materials of various types and shapes.
Singleshaft Rotor Shredder
Preferred Technical Specification:
  Single shaft shredder
  Rotor diameter: 370 mm and 500 mm
  Throughput: up to 1000 kg/hour
  Hydraulic material feeding system
  Required power: 45-110 kW
  Low constant rotor speed of 150 RPM
  Main drive with electric motor, belt drive, fluid coupling and reduction gear.
  Profiled rotor with toothed counter knife Operation Information:
  The material was conveyed on a feeding belt into the hopper and processed by the rotor against the screen
  If the shredded material could of pass through the screen, it was processed again
  The material was conveyed into a big bag
Fine Opener
Preferred Technical Specification:
  Nominal working width: 1500 mm
  Max production: kg/h 300/400
  Opening roller has a diameter of 500 mm
  Motor gearbox for the control of the opener introduction 1.1 Kw
  Motor gearbox for the control of the carding rollers of the opener 0.55 Kw
  Motor for the control of the opening roller 11 kW
  Motor of the exhauster 7.5 kW
  Max speed of the opening roller: revolutions/min 960
  Max introduction speed 10 mt/min
  Exhauster for the material coming out of the selvedges opener with 252 Kgf/m3: Delivery 4500/5000 m3/h
  Maximum thickness of incoming material: 10 mm depending on the type and density of the feedstock.
  The machine was driven by a 3 phase motor and a fan
  Total installed power: 20.2 Kw 380V-50 Hz
Operational Information:
  The equipment was composed of a feeding conveyer unit, feeding unit, working rollers and main operation roll.
  The working rolls and the opening rolls were clothed with rigid wire or pins depending on the openness of the fibres.
  The working rolls, the opening roll and the feeding rolls were controlled by an inverter so the operator could adjust the suitable speed.
  The material was transported by a conveyer belt to a group of introducer cylinders. The introducer cylinder compressed the material and brought it to the cylinders opening.
  The effect of the carding cylinders with different rotation speeds provided an effective aperture of the material
  The adjustment of the cylinders guaranteed the opening of various types of materials.
  Automatic stop feeding in terms of blocking objectionable material, and the possibility of reverse power.
Airlaid Plant
Preferred Technical Specification:
  Capacity: (width 1000 mm) 1000 kg/h
  Production width: 250-5000 mm
  Line speed: Up to 200 m/min
  Web height: 1-400 mm Example 1

Production of Shredded Glass

Shredded glass was developed in a shredding process using mixed types and glass fibre reinforced multiaxials as feedstock including uniaxials, biaxials and triaxial with varying weight per square meter ranging from 200 g/m$^2$ to 2500 g/m$^2$. The product had a relatively large difference with respect to the fibre length of the shredded material. The fibres will vary from 1 mm to more than 70 mm due to the process. There was an amount of glass fibre dust present in the product. The glass had a tendency to lump together in the size of small cotton-balls. The visual appearance of the glass was that the material did not look very homogeneous due to the varying of fibre lengths and the amount of fibres lumped together in what appeared to be randomly. The colour was varying degrees of grey. The content of polyester thread was between 0.1-2.5%. The glass fibre was itchy if contact with the skin. The grinded material usually consisted of more than one type of glass fibre reinforcement fabric. This means that the grinded glass will consist of fibres with different types and diameters of filaments coated with various types of sizing and various sizes of rovings used.

The product was made by the following process:

The fabric was transported on a conveyer belt into a rotor-cutting machine, shredding the material to a material of a length of the filaments of approximately an average of 50 mm. The shredder was a single shaft shredder fitted with a rotor with a diameter of 370 mm. The rotor was profiled with toothed counter knife and was driven by an electric motor with a belt drive, fluid coupling and reduction gear. The engine had a required power of 45-110 kW which ensured a low constant rotor speed of 150 RPM.

The material may be further processed through the condenser, wherein a fan through a hose into a silo fed the material where the glass dust was reduced by using a condenser technology. The condenser was a system of separation air and fiber developed to optimize the discharge of material on a silo. The condenser provided a constant pressure in the suction pipe and rain-uniform inside the silo feeder. The machine was composed of an inlet chamber of the material (area under pressure), two cylinders (sieve) with small holes for the deposit of fiber and exhaust of the air in the cylinder (vacuum area) and 3 sealing system for the division of shares under pressure and depression. When the fibre material entered the condenser it attached to the perforated surface of the cylinders, the dust was sucked out with the air due to the combined effect of pressure on the outside and the inside of the cylinder. When the cylinder turned it passed an area without suction which caused the fibre material to fall down by the effect of its own weight into the silo.

The material was conveyed on a feeding belt into the hopper, and a hydraulic material feeding system ensured that the material was effectively processed. If the shredded glass could not pass through the 50 mm screen, it was processed again. The throughput was 1000 kg per hour. The shredded glass was conveyed into a big bag.

The shredded glass may be used as feedstock for producing nonwoven airlaid as well as cavity wall insulation as explained above.

Example 2

Production of Nonwoven Felt

A non-woven felt was made by an air laid process for acoustic and thermal insulation. The visual appearance of the felt showed that fibres varied in size and some fibres had not opened fully in the shredding process. The colour was greyish but varied in colour. The content of polyester thread was between 0.1-2.5%. The nonwoven felt was produced with a height (thickness) of 5 mm. The fibres processed through the shredder mounted with a 25 mm screen added 20% coPET/PE added with a weight of 1022 g per m$^2$ which had been through an oven and a calender process had a "Dynamometric resistance in N" of 119.5 in machine direction and 176.2 in cross direction and a "Young modulus in Mpa" of 81.2 in machine direction and 155.0 in cross direction.

The product was made by the following steps:
Step 1:
Shredded material was developed in a shredding process using mixed types and glass fibre reinforced multiaxials as feedstock including uniaxials, biaxials and triaxial with varying weight per square meter ranging from 200 g/m2 to 2500 g/m2. The fabric was transported on a conveyer belt into a rotor-cutting machine, shredding the material to a material of a length of the filaments of an average of approximately 25 mm. The shredder was a single shaft shredder fitted with a rotor with a diameter of 370 mm. The rotor was profiled with toothed counter knife and was driven by an electric motor with a belt drive, fluid coupling and reduction gear. The engine had a required power of 45-110 kW which ensured a low constant rotor speed of 150 RPM.

There was a relatively large difference on the fibre length of the shredded material. The fibres will vary from 1 mm to more than 40 mm due to the process. There was an amount of glass fibre dust present in the product. The glass had a tendency to lump together in the size of small cotton-balls. The visual appearance of the glass was that the material did not look very homogeneous due to the varying of fibre lengths and the amount of fibres lumped together in what appeared to be randomly. The colour was varying degrees of grey. The content of polyester thread was between 0.1-2.5%. The glass fibre was itchy if in contact with the skin. The grinded material usually consisted of more than one type of glass fibre reinforcement fabric. This means that the grinded glass will consists of fibres with different types and diameters of filaments coated with various types of sizing and various sizes of rovings used.

The material was conveyed on a feeding belt into the hopper, and a hydraulic material feeding system ensured that the material was effectively processed. If the shredded material cannot pass through the 25 mm screen, it was processed again. The throughput was 1000 kg per hour. The shredded material was conveyed into a big bag.
Step 2:
In order to get a good fibre blending the material was taken into an opener/breaker device. During this operation, fibres were split one from another in order to gain volume and allow fibres blending. If the fibres were fully opened, this ensured the best evenness of the web. During this operation, the glass fibres were blended with melting fibres.
Step 3:
The material was taken through a volumetric feeding device.
Step 4:
The fibres were blown in a drum with 6 mm holes or slots. The compacter pressure was 3.5 bars. The drum was in contact with a woven band with a vacuum-operated device to suck the fibres and maintain them on the conveyor belt with a speed of 3 meters per minute.
Step 5:
The belt with the airlaid material was taken through an oven with a temperature of 165° C. During this operation the melting part of the bi-component fibre used to create the bonding between fibres was partly fused and therefore generated a certain level of cohesion between fibres. The cohesion given to the fibres was sufficient to allow the manipulation of the obtained non-woven product. The air flow fan worked at a speed of 800 RPM.

The nonwoven felt may be used for acoustic and thermal insulation.

Example 3

Production of Nonwoven Insulation Material

A non-woven insulation material was made by an air laid process for acoustic and thermal insulation. The visual appearance of the felt showed that fibres varied in size and some fibres had not opened fully in the shredding process. The colour was greyish but varied in colour. The content of polyester thread was between 0.1-1.5%. The nonwoven insulation was produced with a height (thickness) of 150 mm. Material from the shredder mounted with a 50 mm screen was added 20% coPET/PE fibres. The fibres were approximately 50 mm in length but varied from 1-70 mm due to the process. A different approach to a traditional non-woven air laid technology was applied.

The non-woven insulation substituted traditional insulation materials, for instance traditional glass wool products, mineral wool products, paper wool products and natural fibres.

The product was made by the following steps:

Step 1:

Shredded material was developed in a shredding process using mixed types and glass fibre reinforced multiaxials as feedstock including uniaxials, biaxials and triaxial with varying weight per square meter ranging from 200 g/m2 to 2500 g/m2. The glass fibre reinforced multiaxial fabric was transported on a conveyer belt into a rotor-cutting machine, shredding the material to a material of a length of the filaments of an average of approximately 50 mm. The shredder was a single shaft shredder fitted with a rotor with a diameter of 370 mm. The rotor was profiled with toothed counter knife and was driven by an electric motor with a belt drive, fluid coupling and reduction gear. The engine had a required power of 45-110 kW which ensured a low constant rotor speed of 150 RPM.

There was a relatively large difference of the fibre length in the shredded material. The fibres will vary from 1 mm to more than 70 mm due to the process. There was an amount of glass fibre dust present in the product. The glass had a tendency to lump together in the size of small cotton-balls. The visual appearance of the glass was that the material did not look very homogeneous due to the varying of fibre lengths and the amount of fibres lumped together in what appeared to be randomly. The colour was varying degrees of grey. The content of polyester thread was between 0.1-2.5%. The glass fibre was itchy if in contact with the skin. The grinded material usually consisted of more than one type of glass fibre reinforcement fabric. This means that the grinded glass will consists of fibres with different types and diameters of filaments coated with various types of sizing and various sizes of rovings used.

The material was conveyed on a feeding belt into the hopper and a hydraulic material feeding system ensured that the material was effectively processed. If the shredded material could not pass through the 50 mm screen, it was processed again. The throughput was 1000 kg per hour. The shredded material was conveyed into a big bag.

Step 2:

In order to get a good fibre blending the material was taken into an opener/breaker device. During this operation, fibres were split one from another in order to gain volume and allow fibres blending. If the fibres were fully opened, this ensured the best evenness of the web. During this operation, the glass fibres were blended with melting fibres.

Step 3:

The material was taken through a volumetric feeding device.

Step 4:

The fibres were blown in a drum with 6 mm holes or slots. The compacter pressure was 3.5 bars. The drum was in contact with a woven band with a vacuum-operated device to suck the fibres and maintain them on the conveyor belt with a speed of 3 meters per minute.

Step 5:

The belt with the airlaid material was taken through an oven with a temperature of 165° C. During this operation the melting part of the bi-component fibre used to create the bonding between fibres was partly fused and therefore generated a certain level of cohesion between fibres. The cohesion given to the fibres was sufficient to allow the manipulation of the obtained non-woven product. The air flow fan worked at a speed of 800 RPM.

Example 4

Production of Glass Fibre Wool

This product could be used as acoustic insulation wool for exhaust systems and mufflers as a finished product, or it could be used as feedstock for the non-woven needle punching process creating a needlemat. The filaments were 16-18 cm long; however, due to process the glass filaments were not exactly the same length—some filaments were shorter than 16 cm and some were longer than 18 cm. The density was about 70 g/liter and the visual appearance of the glass wool was white in colour with an airy and fluffy consistency. The wool appeared quite homogenous; however, it was possible to see how the density of the material varied. Also there were small pieces of polyester thread visible. The material contained between 0.1-2.5% polyester thread. The material contained small amounts of glass fibre dust but the majority had been removed by condenser technology. In heat tests where the glass was placed in a holder in a furnace starting at one hour at 400 degrees Celsius increasing every hour by 100 degrees, the material was in good shape at 700 degrees Celsius, but after one hour at 800 degrees Celsius the material was flat and hard. This product could be provided in bulk or packed in small easily burnable plastic bags or nets to be placed in the muffler. The acoustic insulation wool could substitute virgin glass fibres originally made for this purpose, for instance chopped strands or continuous rovings.

The product was made by the following steps:

Step 1:

The glass fibre fabric material had to be sorted first to ensure the same type of feedstock material is used. The material was opened using a fine opener. The equipment consisted of a feeding conveyer unit, feeding unit, working rollers and main operation roll. The working rolls and the opening rolls were clothed with rigid wire. The working rolls, the opening roll and the feeding rolls were controlled by an inverter so the operator could adjust the suitable speed. The material was transported by a conveyer belt to a group of introducer cylinders. The introducer cylinder compressed the material and brought it to the cylinder opening. The effect of the carding cylinders with different rotation speeds provided an effective aperture of the material. The fine opener had a working width of 1500 mm and a production capacity of 400 kg per hour and was fed into the machine with a maximum introduction speed of 10 meters per minute. The fine opener had an opening roller with a diameter of 500 mm with a motor for the control of the opening roller of 11 kW providing the opening roller with a speed of 960 RPM. The machine was driven by a 3 phase motor with a fan with a total installed power of 20.2 kW 380V-50 Hz. The acoustic pressure without the exhauster was Lep d(A)<70 and with the acoustic pressure of the exhauster of Lep dB(A)<82. After the material was fed into the machine, a horizontally placed cylinder with ridged wires tore the fabric into glass fibre wool material.

Step 2:

A fan through a hose into a silo fed the material where the glass dust was reduced by using a condenser technology. The condenser was a system of separation air and fiber developed to optimize the discharge of material on a silo. The condenser provided a constant pressure in the suction pipe and rain-uniform inside the silo feeder. The machine was composed of an inlet chamber of the material (area under pressure), two cylinders (sieve) with small holes for the deposit of fiber and exhaust of the air in the cylinder (vacuum area) and three sealing systems for the division of shares under pressure and depression. When the fibre material entered the condenser it attached to the perforated surface of the cylinders, the dust was sucked out with the air due to the combined effect of pressure on the outside and the inside of the cylinder. When the cylinder turned it passed an area without suction which caused the fibre material to fall down by the effect of its own weight into the silo.

Step 3:

The material was then fed automatically into a bailing press compressing the material into bales of 700 mm (L)× 700 mm (W)×600 mm (H) in a bailing press machine. The bailing press was a channel bailing process with fully automated compression and a loading hopper for continuous feeding. The driving power was 7.5 kW providing a pressing power of 140 kW and a specific pressing power of 33.3 N/cm3. The cycle time was 28 seconds delivering a throughput of 35 m3 per hour. The bales were manually strapped and palletized.

Alternatively the material is packed in polyethylene nets of a size suitable for the purpose, such as for mufflers and exhaust emission control systems. After the material exits the silo it is fed onto a weight determine the weight is within +/−5% of the desired weight. The material was pushed through a pipe by a piston. The pipe had reduced diameter at the exit end which compress the material before it entered the continuous polyethylene net. The net was cut and sealed in each end before it was placed in a box. The pre-packed nets were compressed by vacuum in the packing process to reduce space and transportation costs.

The glass fibre wool produced may be used as such for exhaust or muffler acoustic insulation or as feedstock in the preparation of a needlemat.

Example 5

Production of Wool for a Needlemat

This product could be used as acoustic insulation wool for exhaust systems and mufflers as a finished product or as feedstock for the non-woven needle punching process creating a needlemat. The filaments were 11-13 cm long; however, due to process the glass filaments were not exactly the same length—some filaments were shorter than 11 cm and some were longer than 12 cm. The density was about 70 g/liter and the visual appearance was that the glass wool was white in colour with an airy and fluffy appearance. The wool appeared quite homogenous; however, it was possible to see how the density of the material varied. Also small pieces of polyester thread were visible. The material contained between 0.1-2.5% polyester thread. The material contained small amounts of glass fibre dust but the majority had been removed through a condenser technology. In heat tests where the glass was placed in a holder in a furnace starting at one hour at 400 degrees Celsius increasing every hour by 100 degrees, the material was in good shape at 700 degrees Celsius, but after one hour at 800 degrees Celsius the material was flat and hard. This product could be provided in bulk or packed in small easily burnable plastic bags to be placed in the muffler. The acoustic insulation wool could substitute virgin glass fibres originally made for this purpose, for instance chopped strands or continuous rovings.

The product was made by the following steps:

Step 1:

Fabric was pre-cut in pieces 15×15 cm using two guillotine cutters. The glass fibre reinforcement multiaxials had to be sorted first to ensure the same type of material of unidirectional 1150 combi. The material was fed into a reinforced guillotine cutting machine. This cutting machine was equipped with a tungsten carbide mobile knife which was able to cut the hard glass fibre materials with a speed of 400 cuts per minute. The cutting width was 280 mm effective for a 700 mm table infeed width. The production capacity was about 1000 kg/hour. The cutting machine was driven by a three phase enclosed motor with cooled housing with a total installed power of 9.2 Kw/50 Hz-10.6 Kw/60 Hz. The material was conveyed on a feeding belt to an awaiting hardened steel roll assembly. The rolls compressed the material on the feed table and drew it efficiently toward the knives. The scissor effect produced between the carbide mobile knife and the fixed knife ensured a clean edged cut of 15 cm. The fabric was conveyed into another similar cutting machine with a 90 degrees angle to the machine direction. The cutting machine was set at a similar setting producing cuts of 15 cm. The square pieces of fabric were of a size of 15×15 cm.

Alternatively the fabric was pre-cut in pieces of 60 to 80 mm using a guillotine cutter leading to smaller pieces of fabric which was otherwise treated in the same manner.

Step 2:

The material was conveyed into a tearing line. The tearing machine had a production capacity of 1000 kg per hour and a working width of 1500 mm. The tearing line had three cylinders and was adjustable while running. The output filaments were 6 to 8 cm long.

Step 3:

A fan through a hose into a silo fed the material where the glass dust was reduced by using a condenser technology. The condenser was a system of separation air and fiber developed to optimize the discharge of material on a silo. The condenser provided a constant pressure in the suction pipe and rain-uniform inside the silo feeder. The machine was composed of an inlet chamber of the material (area under pressure), two cylinders (sieve) with small holes for the deposit of fiber and exhaust of the air in the cylinder (vacuum area) and 3 sealing systems for the division of shares under pressure and depression. When the fibre material entered the condenser it attached to the perforated surface of the cylinders, the dust was sucked out with the air due to the combined effect of pressure on the outside and the inside of the cylinder. When the cylinder turned it passed an area without suction which caused the fibre material to fall down by the effect of its own weight into the silo.

Step 4:

The material was then fed automatically into a bail press compressing the product into bales of 700 mm (L)×700 mm (W)×600 mm (H) in a bailing press machine. The bailing press was a channel bailing process with fully automated compression and a loading hopper for continuous feeding. The driving power was 7.5 kW providing a pressing power of 140 kW and a specific pressing power of 3.3 N/cm3. The cycle time was 28 seconds delivering a throughput of 35 m3 per hour. The bales were manually strapped and palletized.

Example 6

Production of Chopped Strands

Chopped strands, dry or wet, could be made out of a uni-directional multiaxial fabric. The strands were chopped to a length of 6 mm. The filaments did not stick perfectly together in the strand (as they do in a virgin chopped strand)—single filaments tended to become loose and fall off the strand. Some strands will vary slightly in length. Some will be slightly longer and some shorter (+/−1 mm) due to the chopping process. The chopped strands were not chopped off 100% straight due to the chopping process. Some chopped strands were cut straight, others slightly skewed. The material contained small pieces of polyester thread as well as glass fibres from the thin layer of chopped strand mat that was often stitched to the back of the mat. The content of polyester thread was between 0.1-2.5%. The chopped fibres could be used for gypsum plasterboards, bonding pastes, thermoplastics, thermosetting plastics (thermoset) such as bulk moulding compound (BMC), sheet moulding compound (SMC) or dove moulding compound (DMC). The recycled fibres could substitute virgin glass fibres originally made for this purpose, for instance chopped strands, wet used chopped strands or rovings for chopping.

Step 1:

The glass fibre multiaxial reinforcement had to be sorted first to ensure the same type of material of unidirectional 1150 combi. The material was fed into a reinforced guillotine cutting machine. This cutting machine was equipped with a tungsten carbide mobile knife which was able to cut the hard glass fibre materials with a speed of 400 cuts per minute. The cutting width was 280 mm effective for a 700 mm table infeed width. The production capacity was about 1000 kg/hour. The cutting machine was driven by a three phase enclosed motor with cooled housing with a total installed power of 9.2 Kw/50 Hz-10.6 Kw/60 Hz. The material was conveyed on a feeding belt to an awaiting hardened steel roll assembly. The rolls compressed the material on the feed table and drew it efficiently toward the knives. The scissor effect produced between the carbide mobile knife and the fixed knife ensured a clean edged cut.

Step 2:

The chopped strands were conveyed into a mechanical tumbler turning vertically with a low RPM and variable screen size in order to filter off the polyester thread and make sure that the fibres got as pure as possible. However, the process had to be gentle in order to avoid that the strands broke up into single filaments.

Step 3:

The chopped strands may optionally be conveyed through a moisture process adding moisture to the chopped strands so they contained about 7% moisture to increase efficacy of the subsequent process. The chopped strands may for example be used as fire resistant material in gypsum plasterboards.

Finally the chopped strands were conveyed into a big bag for storage.

Example 7

Production of Needlemat

A needlemat was made in a non-woven needle punched process for acoustics and thermal insulation. The felt looked quite homogenous but it was possible to see small pieces of polyester thread. The colour was white-yellow and varied slightly in colour. The glass fibre wool added 20% coPET/PE with a weight of 1129 g per m$^2$ which had been through an oven and a calendar process had a "Dynamometric resistance in N" of 214.1 in machine direction and 705.4 in cross direction and a "Young modulus in Mpa" of 93.0 in machine direction and 501.2 in cross direction. The content of polyester thread was between 0.1-2.5%. The needlemat could substitute a felt made out of virgin glass fibres originally made for this purpose, for instance chopped strands or rovings for chopping.

The product was made by the following steps:

Step 1:

First a wool was created. The filaments were 16-18 cm long; however, due to process the glass filaments were not exactly the same length—some filaments were shorter and some were longer. The density was about 70 g/liter and the visual appearance was that the glass wool was white in colour with an airy and fluffy appearance. The wool appeared quite homogenous; however, it was possible to see how the density of the material varied. Also small pieces of polyester thread were visible. The material contained between 0.1-2.5% polyester thread. The material contained small amounts of glass fibre dust but the majority had been removed in the condenser technology. In heat tests where the glass was placed in a holder in a furnace starting at one hour at 400 degrees Celsius increasing every hour by 100 degrees, the material was in good shape at 700 degrees Celsius, but after one hour at 800 degrees Celsius the material was flat and hard. The acoustic insulation wool could substitute virgin glass fibres originally made for this purpose, for instance chopped strands or continuous rovings.

In the first step of the process the material was opened using a fine opener. The equipment consisted of a feeding conveyer unit, feeding unit, working rollers and main operation roll. The working rolls and the opening rolls were clothed with rigid wire. The working rolls, the opening roll and the feeding rolls were controlled by an inverter so the operator could adjust the suitable speed. The material was transported by a conveyer belt to a group of introducer cylinders. The introducer cylinder compressed the material and brought it to the cylinder opening. The effect of the carding cylinders with different rotation speeds provided an effective aperture of the material. The fine opener had a working width of 1500 mm and a production capacity of 400 kg per hour and was fed into the machine with a maximum introduction speed of 10 meters per minute. The fine opener had an opening roller with a diameter of 500 mm with a motor for the control of the opening roller of 11 kW providing the opening roller with a speed of 960 RPM. The machine was driven by a 3 phase motor with a fan with a total installed power of 20.2 kW 380V-50 Hz. The acoustic pressure without the exhauster was Lep d(A)<70 and with the acoustic pressure of the exhauster of Lep dB(A)<82. After the material was fed into the machine, a horizontally placed cylinder with rigid wires tore the fabric into glass fibre wool.

Step 2:

A fan through a hose into a silo fed the material where the glass dust was reduced by using a condenser technology. The condenser was a system of separation air and fiber developed to optimize the discharge of material on a silo. The condenser provided a constant pressure in the suction pipe and rain-uniform inside the silo feeder. The machine was composed of an inlet chamber of the material (area under pressure), two cylinders (sieve) with small holes for the deposit of fiber and exhaust of the air in the cylinder (vacuum area) and 3 sealing systems for the division of shares under pressure and depression. When the fibre material entered the condenser it attached to the perforated surface of the cylinders, the dust was sucked out with the air due to the combined effect of pressure on the outside and the inside of the cylinder. When the cylinder turned it passed an area without suction which caused the fibre material to fall down by the effect of its own weight into the silo.

Step 3:

The glass was opened up and taken through a dry-laid carding system also called a needle punched non-woven process where a needle punched textile was created by mechanically orienting and interlocking the fibres of a carded web. The applied process was that the fibres were first opened again using an opener. First step of the process: During this operation, fibres were split one from another in order to gain volume and allow fibres blending. The maximum the opening; the best was the evenness of the web. During this operation, the glass fibres were blended with melting fibres.

Step 4:

Fibres went through the card and came out clean and relatively parallel. The first part allowed the introduction of the fibre via a "feeding cylinder" (taker-in, licker-in roll feed); the second part performed the carding operation itself. It included a "drum major" (carding cylinder), surrounded by satellites. Each satellite consisted of a "working cylinder" (worker roll) associated with a "stripper cylinder" (stripper roll). The cylinder stripper was responsible for cleaning the working cylinder. The main drum rolls and workers had a coating bristled with spikes, and they played the role of the former wood boards. The third part got a web through the "doffer roller" (doffer, Doffing cylinder).

Step 5:

The 1 meter wide web to be needle punched was made by successive alternative movements of the carding web. Needle-punched web weight and height were given by the setting of machine conveyor speed versus the frequency of the alternative movements.

Step 6:

The needle puncher equipment delivered single hit upper tray: 100 hits/cm$^2$. Consolidation of the web by fibres entanglement.

Step 7:

Melting of outer shell of the bi-component PES Oven Temperature: 165° C. Air flow fan: 800 RPM. During this operation, the melting part of the fibre used to create the bonding between fibres was partly fused and therefore generated a certain level of cohesion between fibres. The cohesion given to the fibres was sufficient to allow the manipulation of the obtained non-woven product.

Example 8

Test of Insulation Properties

Wool obtained as described in Example 5 was tested in a loudspeaker measurement and the acoustic absorption was measured. Three different densities of the wool was tested, namely 120 g/l, 96 g/l and 77 g/l.

The measurements were conducted with a pipe D54×1.5 mm and two microphones where the distance between microphone 1 and microphone 2 is 80.3 mm and the distance between microphone 1 and the wool sample is 138.0 mm. Wool samples are fixed inside the pipe, and the measurements are done from 20 to 1200 Hz in steps of 2 hZ. A measurement is also performed with an empty pipe as a reference.

Figure 7:
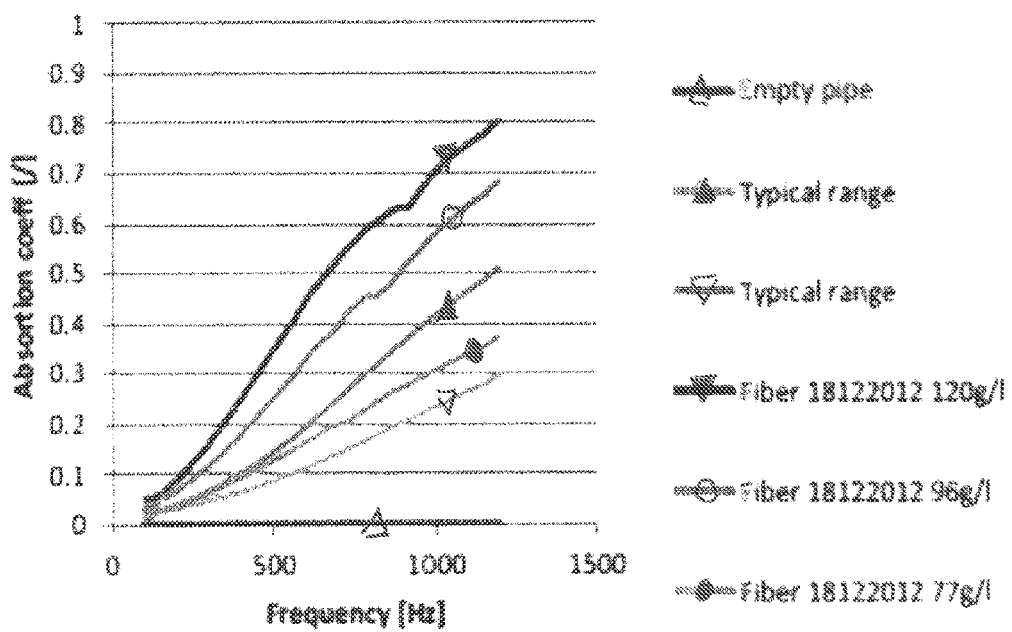
FIG. 7 shows the results of the measurements in Example 8.

The results are shown in FIG. 7 from which it is seen that the wool sample having a density of 77 g/l lies within the normal range and that the other two samples have better acoustic absorption. This may be compared with conventional products where a wool sample of a density of about 120 g/l lies within the normal range. Accordingly, it may be concluded that the wool obtained according to the present invention has insulation properties which are about 25% to 50% better than conventional products.

Furthermore, the weight loss of material during the test was measured and found to be about 1%, as compared to conventional glass fibre wool, where the loss typically is about 3%.

The invention claimed is:

1. A method of converting a glass fibre fabric material into another glass fibre product by a mechanical process, wherein said fibre fabric material has not been embedded in a matrix material, wherein said fabric material is unidirectional or multiaxial and is made up of multilayers of glass fibres in one or more directions stitch bonded together into a fabric, said glass fibres being coated with a sizing, wherein the fabric material is cut into glass fibres having a length of from 5 cm to 30 cm, and subsequently the cut fibres are further processed into said other glass fibre product.

2. The method according to claim 1, wherein the glass fibre fabric material is a production waste material.

3. The method according to claim 1, wherein the glass fibre fabric material is bendable or flexible.

4. The method according to claim 1, wherein said one or more directions is (are) parallel with the surface of the material.

5. The method according to claim 4, wherein the glass fibre fabric material is stitch bonded by polyester thread.

6. The method according to claim 5, wherein the glass fibres are further processed by a condensing technique.

7. The method according to claim 1, wherein the mechanical process is performed by a cutting process cutting the material into chopped glass fibre strands.

8. The method according to claim 7, wherein the cutting process is followed by a tearing process.

9. The method according to claim 7, wherein the glass fibre strands are further processed by a filtering process purifying the chopped glass fibre strands.

10. The method according to claim 7, wherein the chopped glass fibre strands have a length of from 8 cm to 20 cm.

11. The method according to claim 7, wherein the chopped glass fibre strands are further processed by a tearing process into glass fibre wool.

12. The method according to claim 11, wherein the glass fibre wool is further processed through a needle punched processing into a needle mat.

13. The method according to claim 12, wherein the needle punched processing is performed at temperatures below 300 degrees Celsius.

14. The method according to claim 7, wherein said chopped glass fibres are sorted and optionally moistened.

15. The method according to claim 1, wherein the material is a unidirectional material.

16. The method according to claim 1, wherein the glass fibre product is processed into a non-woven felt, air-laid or needle punched.

17. The method according to claim 16, wherein the glass fibre product is taken through a calendar process with two cylinders that impart heat and pressure as the sheets are drawn between them in order to increase density and cohesiveness.

18. A method of converting a glass fibre fabric material into another glass fibre product by a mechanical process, wherein said fabric material is unidirectional or multiaxial and is made up of multilayers of glass fibres in one or more directions stitch bonded together into a fabric, said glass fibres being coated with a sizing, wherein the fabric material is cut into glass fibres having a length of from 5 cm to 30 cm, and subsequently the cut fibres are further processed into said other glass fibre product,
    wherein the mechanical process is performed by a cutting process cutting the material into chopped glass fibre strands,
    wherein the cutting process is performed using knives.

19. The method according to claim 18, wherein the knives are made from tungsten carbide.

\* \* \* \* \*